United States Patent [19]

McElroy

[11] 4,351,200

[45] Sep. 28, 1982

[54] REMOVABLE SNAP-ON ACTUATORS FOR PROGRAM TIMER DIAL

[75] Inventor: Jerry W. McElroy, St. Louis, Mo.

[73] Assignee: Emerson Electric Co., St. Louis, Mo.

[21] Appl. No.: 176,862

[22] Filed: Aug. 11, 1980

Related U.S. Application Data

[62] Division of Ser. No. 34,449, Apr. 30, 1979, abandoned.

[51] Int. Cl.$^3$ ...................... F16H 53/00; H01H 43/10

[52] U.S. Cl. .............................. 74/568 T; 200/38 BA

[58] Field of Search ................... 74/568 T; 200/38 A, 200/38 FA, 38 FB, 38 BA, 38 CA, 38 D, 38 DA, 38 DB

[56] References Cited

U.S. PATENT DOCUMENTS

| | | | |
|---|---|---|---|
| 1,966,958 | 7/1934 | Fisher | 200/38 DA |
| 1,970,432 | 8/1934 | Porter | 200/38 DA |
| 3,487,180 | 12/1969 | Jordan | 200/38 A |
| 3,678,225 | 7/1972 | Hulterstrum | 200/38 BA |

FOREIGN PATENT DOCUMENTS

| | | | |
|---|---|---|---|
| 2603302 | 4/1977 | Fed. Rep. of Germany | 200/38 CA |

*Primary Examiner*—Kenneth Dorner
*Attorney, Agent, or Firm*—Paul A. Becker, Sr.

[57] ABSTRACT

Actuators for a program timer are removably attached to the timer dial in a snap-on manner to enable simple and easy removal or installing of the actuators to effect changing the schedule of operation of the timer.

1 Claim, 10 Drawing Figures

REMOVABLE SNAP-ON ACTUATORS FOR PROGRAM TIMER DIAL

This application is a division of application Ser. No. 34,449, filed Apr. 30, 1979 and now abandoned.

This invention relates to program timers wherein a dial is provided with a plurality of actuators effective to operate a controlled device, and particularly to actuator construction in such program timers to enable the actuators to easily be installed or removed from the dial.

Program timers for providing a schedule of operation over a set reference period are well known. Such timers generally include a dial with appropriate indicia, such as for a 24-hour period, and actuators attached to the dial to operate a switch or some mechanical means at times determined by the location of the actuators with respect to the dial.

The prior art discloses various dial and actuator constructions which enable changing the schedule of operation of the timer. Some such prior art constructions employ actuators attached to the dial with thumbscrews. Other prior art constructions employ dials with holes or slots in the periphery thereof for accepting pins, screws, clips, and the like. While such constructions enable changing the timer schedule of operation by either removing or installing actuators, or by moving the actuators between operative and inoperative positions, the actuators and dials utilized are generally quite complex in construction.

An object of this invention is to provide a generally new and improved actuator construction in a program timer wherein the actuators are removably attached to the timer dial in a snap-on manner.

A further object is to provide an actuator construction in a program timer wherein the actuators are constructed to be removably attached in a snap-on manner to the periphery of the timer dial.

A further object is to provide a snap-on actuator construction for a program timer which enables relatively easy removal or installing of actuators to the timer dial for effecting a change in the timer schedule of operation.

These and other objects and advantages of the present invention will become apparent from the following description when read in connection with the accompanying drawings.

DESCRIPTION OF THE PREFERRED EMBODIMENT

Figure 1:
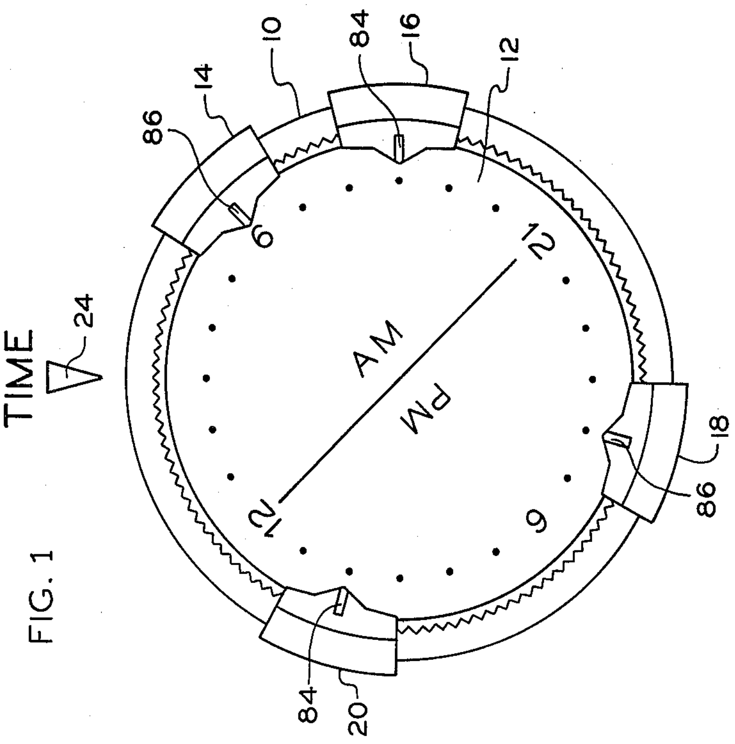
FIG. 1 is a top plan view of the program timer dial and actuators of the present invention shown with the actuators attached to the dial.

Referring to FIG. 1, a program timer dial 10 is provided with a suitable 24-hour indicia plate 12. Attached to the periphery of dial 10 are actuators 14, 16, 18, and 20. Dial 10 is connected in any suitable manner to an output shaft 22, shown in FIG. 4, of a timer motor (not shown). Dial 10 is rotated counter-clockwise by shaft 22, and clock time is read by reference to an arrow 24 fixed with respect to the rotating dial 10. For example, in FIG. 1, clock time is 3:00 a.m.

Figure 2:
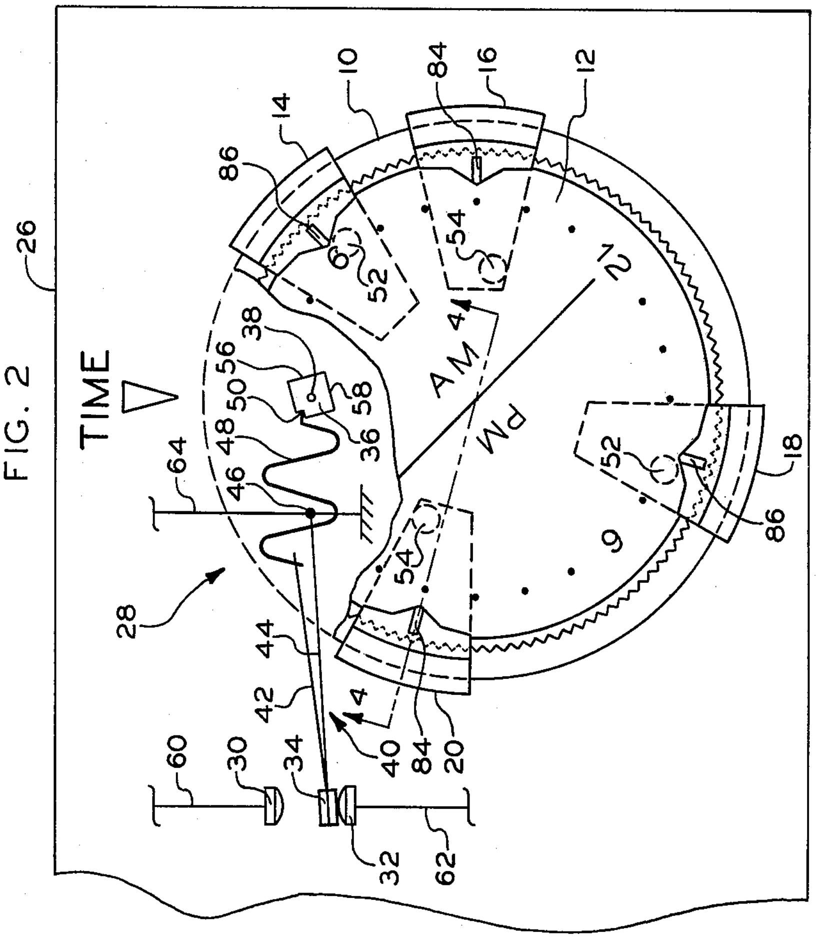
FIG. 2 is a fragmentary top view of the program timer dial and attached actuators shown in connection with a timer switch.

Referring to FIG. 2, dial 10 with actuators 14, 16, 18, and 20 are utilized in a timer mechanism having a housing 26 and a double-throw switch indicated generally at 28. It should be understood that, while the timer mechanism described utilizes electrical switch 28 to effect a controlled timer program, various mechanical means controlled by actuators 14, 16, 18, and 20 could be utilized instead.

Figure 3:
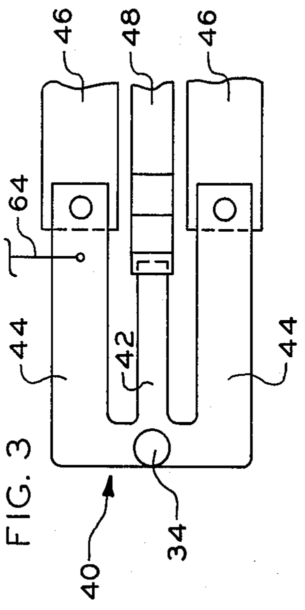
FIG. 3 is a top plan view of the switch blade utilized in the timer switch.

Switch 28 includes fixed contacts 30 and 32 and a movable contact 34. Switch 28 is a bi-stable, over-center, toggle switch actuated by rotational movement of a generally square-shaped member 36 rotatable on a shaft 38 mounted in housing 26. Movable contact 34 is connected to one end of a flat switch blade 40 having stable positions on either side of an unstable center position. The switch blade 40, shown more clearly in FIG. 3, has a compression leg 42 joined at one end to outer tension legs 44. The other ends of outer tension legs 44 are anchored to fixed point 46. A serpentine compression spring 48 is interposed between one end of the center compression leg 42 and a V-shaped groove 50 in rotatable member 56. When member 36 is caused to rotate clockwise about shaft 38 by means to be hereinafter described, switch 28 is actuated to the position shown in FIG. 2 wherein contacts 32 and 34 are closed. When rotatable member 36 is caused to rotate counter-clockwise, switch 28 is actuated to a position wherein contacts 30 and 34 are closed.

Actuators 14 and 18 are identical in construction, and actuators 16 and 20 are identical in construction. Furthermore, actuators 14 and 18 differ from actuators 16 and 20 only in the location of projecting pins 52 on actuators 14 and 18 and pin 54 on actuators 16 and 20, and in some form of color designation or the like, which will be later described.

Pins 52 are radially located on actuators 14 and 18 so that pins 52 contact a segment 56 of rotatable member 36 at a point above shaft 38 as actuators 14 and 18 are moved in a counter-clockwise direction by dial 10. The counter-clockwise movement against segment 56 causes member 36 to be rotated in a counter-clockwise direction, causing contacts 30 and 34 to make. Because switch 28 is bi-stable, contacts 30 and 34 remain closed after pins 52 have subsequently rotated past member 36.

Pins 54 are radially located on actuators 16 and 20 so that pins 54 contact a segment 58 of rotatable member 36 at a point below shaft 38 as actuators 16 and 20 are moved in a counter-clockwise direction by dial 10. The counter-clockwise movement against segment 58 causes member 36 to be rotated in a clockwise direction, causing contacts 32 and 34 to make. Because switch 28 is bi-stable, contacts 32 and 34 remain closed after pins 54 have subsequently rotated past member 36.

FIG. 2 shows contacts 30 and 32 connected to leads 60 and 62, respectively, and fixed point 46 connected to a lead 64. Thus, in the condition shown in FIG. 2, circuitry (not shown) connected to leads 62 and 64 is energizable. As dial 10 subsequently rotates counter-clockwise, pin 52 of actuator 14 effects counter-clockwise rotation of member 36. This causes contacts 30 and 34 to make, enabling circuitry (not shown) connected to leads 60 and 64 to be energized. As dial 10 continues its counter-clockwise rotation, pin 54 of actuator 16 subsequently causes contacts 32 and 34 to make, pin 52 of actuator 18 subsequently causes contacts 30 and 34 to make, and pin 54 of actuator 20 causes contacts 32 and 34 to make. Details of the circuitry connected to leads 60, 62, and 64 are not considered essential to understanding the present invention and thus are omitted. Reference may be had to U.S. Pat. No. 4,049,973 for details of such circuitry.

While dial 10 is shown with four actuators 14, 16, 18, and 20, it is to be understood that only two or an even number of actuators greater than four may be utilized, depending on the timer schedule desired. Regardless of the number of actuators utilized, the actuators are attached to the perimeter of dial 10 in such a manner that pins 52 and 54 are alternately located.

The construction of actuator 20 is illustrated in FIGS. 6, 7, 8, and 9. As previously noted, actuator 16 is identical to actuator 20, and except for the difference in location of projecting pins 52 and 54 and some form of color or similar designation, is the same as actuators 14 and 18. Referring to FIGS. 6, 7, 8, and 9, actuator 20 is made of plastic and is generally U-shaped, comprising a lower horizontal portion 66, a vertical portion 68 including a lower vertical portion 70 perpendicular to lower horizontal portion 66 and an upper vertical portion 72 at an angle with lower vertical portion 70, and an upper horizontal portion 74 which overlies a portion of lower horizontal portion 66. Lower horizontal portion 66 is generally trapezoidal in shape and includes a triangular shaped projection 76 extending upwardly therefrom for a portion of its longitudinal axis and outwardly from the intersection of lower horizontal portion 66 and vertical portion 68. Spaced from vertical portion 68 and contiguous with one side of triangular projection 76 is a spherically shaped projecting portion 78 in the form of a quarter of asphere. Pin 54, integral with lower horizontal portion 66 and extending downwardly therefrom, is located at such a distance from vertical portion 68 and from the longitudinal axis of lower horizontal portion 66 so that when actuator 20 is snapped on to dial 10, pin 54 is effective to contact segment 58 of rotatable member 36 and actuate switch 28 at the proper clock time.

Upper horizontal portion 74 is also generally trapezoidal in shape and includes a triangular shaped portion 80 extending outwardly from one end thereof. Triangular portion 80 has a tapered underside 82 for reasons to be hereinafter described.

Extending upwardly from a portion of upper horizontal portion 74 including triangular portion 80 is a narrow projecting portion 84. When actuator 20 is attached to dial 10, projecting portion 84 points to the desired clock time on indicia plate 12 at which switch 28 is to be actuated. To readily identify actuators 16 and 20, which employ pins 54, portions 84 are colored a certain color, for example, blue. Actuators 14 and 18 employ pins 52 and have their projecting portions 86 colored a different color, for example, red. It should be noted that various other means for designating the actuators can be employed.

Spaced from upper vertical portion 72 and extending downwardly from and transversely across the underside of upper horizontal portion 74 is an arcuate porjection 88 having a tapered edge 90 for reasons to be hereinafter described.

Figures 6, 7, 8, 9, 10:
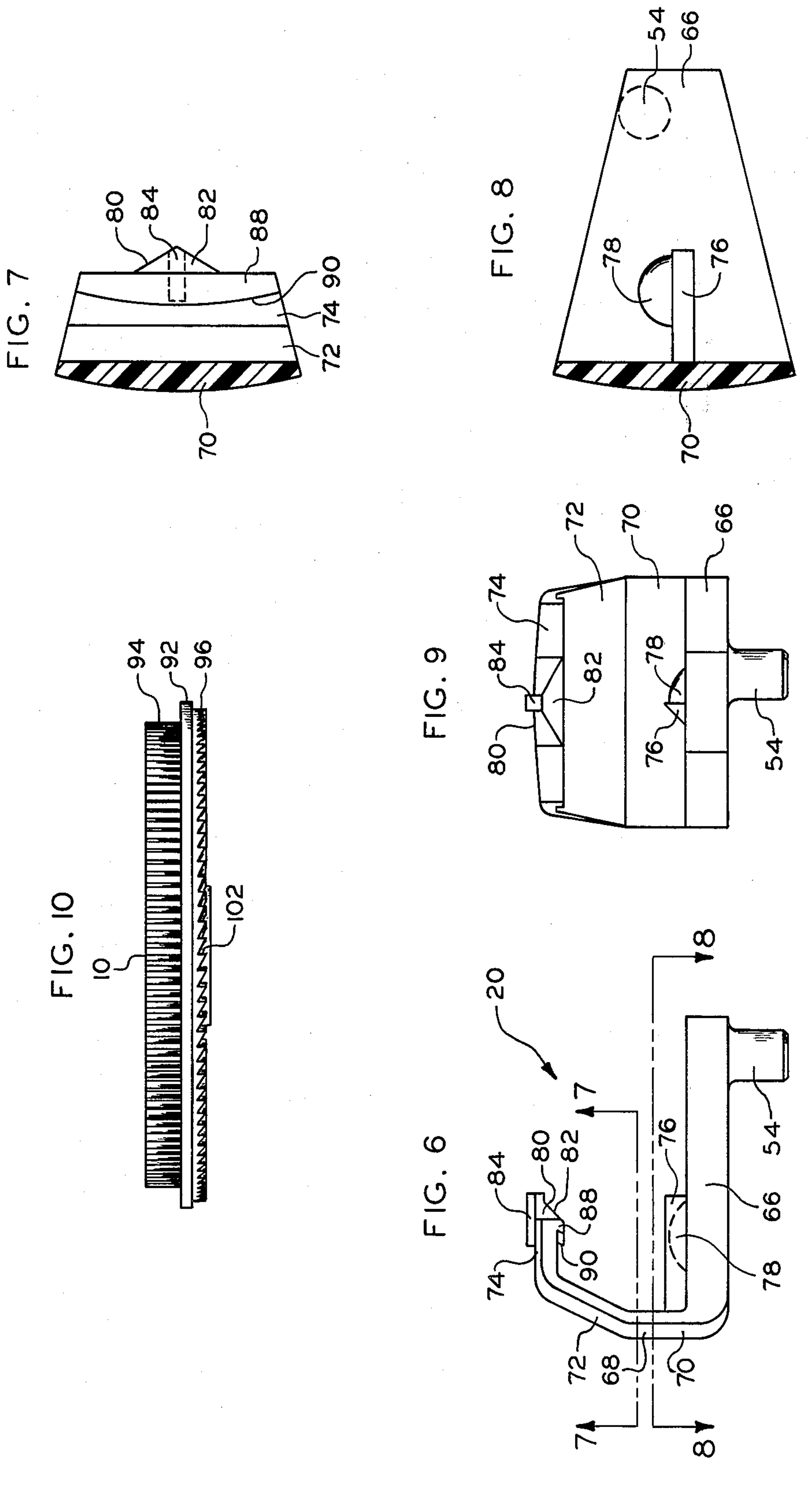
FIG. 6 is a side elevation view of an actuator constructed in accordance with the present invention.
FIG. 7 is a cross-sectional view taken along line 7—7 of FIG. 6.
FIG. 8 is a cross-sectional view taken along line 8—8 of FIG. 6.
FIG. 9 is a front elevation view of the actuator of FIG. 6.
FIG. 10 is an elevation view of the dial utilized in the program timer.

Dial 10, as shown more clearly in FIG. 10, is preferably made of plastic and comprises a large diameter portion 92, a reduced diameter portion 94 extending upwardly from portion 92, and a reduced diameter portion 96 extending downwardly from portion 92. The combined height of diameter portions 92, 94, and 96 is slightly greater than the distance between the top of spherical projection 78 and the underside of upper horizontal portion 74.

Figure 4:
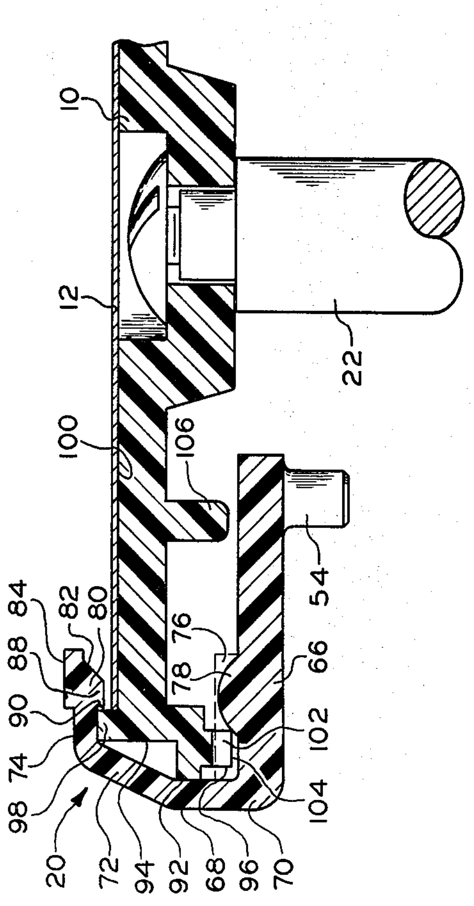
FIG. 4 is a partial cross-sectional view taken generally along line 4—4 of FIG. 2.

The outer surface of portion 94 is knurled to facilitate turning or holding the dial 10. As shown in FIG. 4, a circular rib 98 extends inwardly from diameter portion 94 and defines a depressed portion 100 in which indicia plate 12 is secured. The underside of portion 96 is provided with a plurality of saw-toothed projections 102, as shown in FIG. 10, which extend radially inward a slight amount to provide a narrow circular saw-toothed rib 104 as shown in FIGS. 4 and 5.

Figure 5:
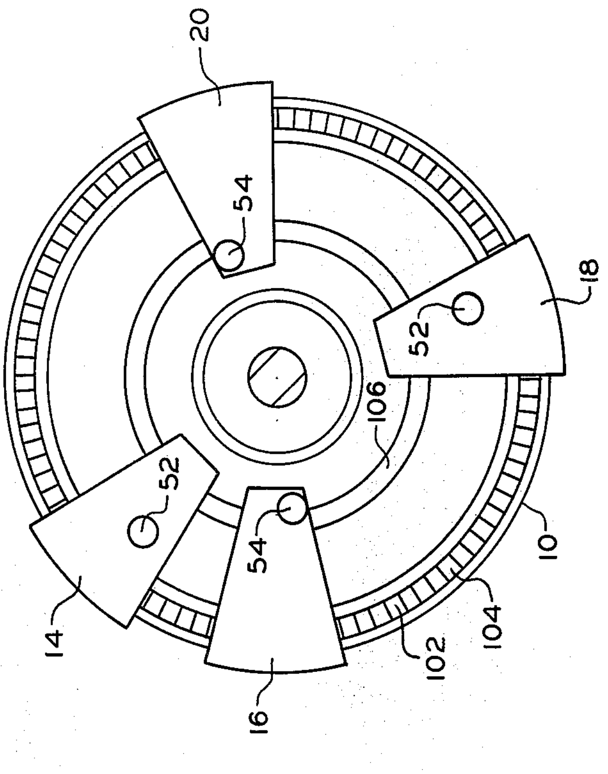
FIG. 5 is a bottom plan view of the dial and attached actuators of FIG. 1.

Preferrably, a narrow circular rib 106, as shown in FIGS. 4 and 5, projects downwardly from the underside of dial 10 to a point approximately in the same plane as the edges of saw-tooth projections 102, and is radially positioned near saw-toothed rib 104. As will be hereinafter described, circular rib 106 facilitates snapping on actuators 14, 16, 18, and 20. Except for circular rib 106, this particular dial has been in use for several years.

Although FIG. 4 shows actuator 20 already attached to dial 10, it is also being referenced in describing the method of snapping actuator 20 to dial 10. To attach actuator 20 to dial 10, actuator 20 is lightly positioned against the periphery of dial 10 so that narrow projection 84 points to the clock time on indicia plate 12 at which actuator 20 is to effect actuation of switch 28. In such an unattached position, triangular projection 76 of lower horizontal portion 66 of actuator 20 partially enters one of the saw-tooth projections 102 of dial 10. Circular rib 106 on the underside of dial 10 limits the upward movement of the end of lower horizontal portion 66 remote from vertical portion 68, so that lower horizontal portion 66 is positioned in a plane generally parallel with the plane of dial 10.

Actuator 20 is then pushed radially inward by applying force generally perpendicular to lower vertical portion 70. The tapered underside 82 of triangular portion 80 enables acutator 20 to flex sufficiently. When this force is applied, to enable the spherical projection 78 to snap over one of the saw-tooth projections 102 in rib 104. Spherical portion 78 then bears against the innermost edge of one of the saw-tooth projections 102. In this position, actuator 20 is secured, in a snap-on manner, to the bottom portion of dial 10.

When actuator 20 is pushed radially inward to effect the above described snap-on attachment to the bottom portion of dial 10, the large diameter portion 92 of dial 10 contacts the inner surface of lower vertical portion 70 of actuator 20. When this contact occurs, arcuate projection 88 is in contact with the upper surface of circular rib 98 on the top portion of dial 10. An additional slight force, applied generally perpendicular to the upper vertical portion 72 of actuator 20, causes upper vertical portion 72 to flex sufficiently to enable arcuate projection 88 to snap over circular rib 98, thus securing actuator 20 to the top portion of dial 10.

When actuator 20 is secured to dial 10, as shown in FIG. 4, spherical projection 78 bears against one of the saw-tooth projections 102. Diameter portion 92 of dial 10 bears against lower vertical portion 70, and tapered edge 90 of arcuate projection 88 bears against the inside wall of circular rib 98. The radius of arcuate projection 88 is the same as the radious of the inner wall of circular rib 98 and the tapered edge 90 on arcuate projection 88 provides a knife-edge contact between arcuate projection 88 and the inside wall of circular rib 98, so that when actuator 20 is attached, there is essentially no relative movement in any direction between actuator 20 and dial 10.

If it is desired to remove actuator 20, either to eliminate its function or to change the clock time at which it is to actuate switch 28, acutator 20 is easily removed from dial 10 by applying an upward and radially outward force to the underside of arcuate projection 88.

While a preferred embodiment of the present invention has been illustrated and described in detail in the drawings and foregoing description, it will be recognized that many changes and modifications will occur to those skilled in the art. For example, if arcuate movement of the actuators without removal thereof were desired, so that the actuators would not have to be removed to change the clock times at which the actuators are to operate switch 28, the saw-tooth projections 102 could be eliminated and replaced by a smooth portion, the triangular projection 76 could be eliminated, and the spherical projection 78 could be changed to a complete hemisphere. With such a construction, the spherical portion would bear against the smooth portion to again secure actuator 20 to the bottom portion of dial 10, but arcuate movement of the actuators about the perimeter of dial 10 could then be effected by applying sufficient force to the actuators in a direction tangential to dial 10. It is therefore intended, by the appended claims, to cover any such changes and modifications as fall within the true spirit and scope of the invention.

I claim:

1. In a program timer, a circular dial;

said dial having a top portion including a circular rib therein and a bottom portion including saw-tooth projections therein;

a plurality of actuators removably secured to said dial for operating a scheduled program;

each of said actuators having an upper portion secured to said top portion of said dial and a lower portion secured to said bottom portion of said dial;

means on said upper portion and lower portion of said each of said actuators for providing a snap-on securement thereof to said dial;

said upper portion of said each of said actuators including an arcuate projection which snaps over and bears against said circular rib in said top portion of said dial, and said lower portion of said each of said actuators including a triangular projection which enters one of said saw-tooth projections in said bottom portion of said dial and a spherical projection which snaps over and bears against said saw-tooth projections.

* * * * *